(12) United States Patent
Hsu

(10) Patent No.: US 7,204,638 B2
(45) Date of Patent: Apr. 17, 2007

(54) PRECISE TEMPERATURE SENSOR WITH SMART PROGRAMMABLE CALIBRATION

(75) Inventor: Jenshou Hsu, Hsin-Chu (TW)

(73) Assignee: Etron Technology, Inc., Hsin-Chu (TW)

( * ) Notice: Subject to any disclaimer, the term of this patent is extended or adjusted under 35 U.S.C. 154(b) by 142 days.

(21) Appl. No.: 11/135,064

(22) Filed: May 23, 2005

(65) Prior Publication Data

US 2006/0262827 A1 Nov. 23, 2006

(51) Int. Cl.
G01K 7/01 (2006.01)
G01K 15/00 (2006.01)
G01K 7/21 (2006.01)
G01K 7/14 (2006.01)

(52) U.S. Cl. .................... 374/1; 374/172; 374/163; 702/99; 327/513

(58) Field of Classification Search .............. 374/1, 374/170–172, 183, 163; 702/133, 99; 327/513
See application file for complete search history.

(56) References Cited

U.S. PATENT DOCUMENTS

| 5,628,929 A * | 5/1997 | Klosterman ............... 219/497 |
| 5,719,378 A * | 2/1998 | Jackson et al. ............ 219/497 |
| 6,377,110 B1 | 4/2002 | Cooper ..................... 327/513 |
| 6,612,737 B1 * | 9/2003 | Lobban .................... 374/183 |
| 6,724,202 B2 * | 4/2004 | Tanizawa .................. 324/725 |
| 6,824,307 B2 | 11/2004 | Vail et al. ................. 374/183 |
| 6,828,847 B1 | 12/2004 | Marinca ................... 327/513 |
| 6,889,152 B2 * | 5/2005 | More ........................ 702/99 |
| 6,997,606 B2 * | 2/2006 | Marinet et al. ........... 374/178 |
| 7,029,171 B2 * | 4/2006 | Tesi et al. .................. 374/1 |
| 2004/0227651 A1 | 11/2004 | Furuichi ................... 341/120 |

OTHER PUBLICATIONS

Co-pending U.S. Patent ET-04-010, U.S. Appl. No. 11/056,796, filed Feb. 11, 2005, "Low Voltage Bandgap Reference (BGR) Circuit", assigned to the same assignee.

* cited by examiner

Primary Examiner—Gail Verbitsky
(74) Attorney, Agent, or Firm—Saile Ackerman LLC; Stephen B. Ackerman

(57) ABSTRACT

A temperature sensor with a plurality of temperature sense points based on a bandgap reference circuit providing negative temperature coefficient reference voltages and a positive temperature coefficient reference voltage. All negative temperature coefficient reference voltages have the same slope and the same spacing from each other. The intercept points between the negative temperature coefficient reference voltages and the positive temperature coefficient reference voltage determine the temperature sense points. Efficient calibration of the spacing of the temperature sense points is provided by a tap on a programmable resistor in the positive temperature coefficient reference circuit. Efficient calibration of the absolute temperature is provided by second programmable resistors in a circuit driven by two current sources. The calibration of one temperature point equally applies to all other second programmable resistors.

18 Claims, 5 Drawing Sheets

```
┌─────────────────────────────────────────────────────────┐
│ Providing first and second reference voltages with negative │
│ and positive temperature coefficients, respectively, where  │
│   the second reference voltage is generated across a first  │──1
│    programmable resistor and which when programmed provides │
│              a third reference voltage                      │
└─────────────────────────────────────────────────────────┘
                            ↓
┌─────────────────────────────────────────────────────────┐
│  Providing amplifying circuits to generate first and second │
│      currents proportional to the first and the second      │──2
│                    reference voltage                        │
└─────────────────────────────────────────────────────────┘
                            ↓
┌─────────────────────────────────────────────────────────┐
│  Connecting a plurality of serially coupled first resistors │
│  and second programmable resistors between the source of the│──3
│           first current and a reference voltage             │
└─────────────────────────────────────────────────────────┘
                            ↓
┌─────────────────────────────────────────────────────────┐
│   Summing the first and the second current by coupling the  │
│  source of the second current to the junction of the first  │──4
│         resistor and the second programmable resistor       │
└─────────────────────────────────────────────────────────┘
                            ↓
┌─────────────────────────────────────────────────────────┐
│ Generating a temperature sense point at the intercept of the│
│   third reference voltage with the voltage generated across │──5
│     each of the combinations of first resistors and         │
│              second programmable resistors                  │
└─────────────────────────────────────────────────────────┘
```

*FIG. 4*

PRECISE TEMPERATURE SENSOR WITH SMART PROGRAMMABLE CALIBRATION

RELATED PATENT APPLICATION

ET04-010, LOW VOLTAGE BANDGAP REFERENCE (BGR) CIRCUIT, title filing date: Feb. 11, 2005, Ser. No. 11/056,796, assigned to a common assignee.

BACKGROUND OF THE INVENTION

1. Field of the Invention

The invention relates to temperature-stabilized sub-1-V bandgap reference voltage circuits, and more particularly to a circuit using a low supply voltage with a plurality of temperature sensors. Programmable adjustable resistors are employed to calibrate the slope (span) and the absolute temperature.

2. Description of the Related Art

Temperature sensors with high precision based on bandgap reference (BGR) circuits which operate in the sub-1-V bandgap reference region using a low voltage power supply are necessary in many applications. Particularly desirable are circuits with multiple temperature sensors where the temperature sensors track each other very closely without requiring complex and extensive circuits placing undue demands on expensive chip real estate and where the programming expense for tracking of the alignment of the temperature sensors is kept to a minimal. The front end of such a circuit demands a low voltage reference. However, it is difficult to approach a stable operation in conventional bandgap reference (BGR) circuits when the supply voltage is under 1.5 V.

Such a circuit is known from the above referenced Related Patent Application, which is expressly referenced herewith. In particular, this circuit produces positive and negative reference voltages based on the area ratio of 1:M of two diode type devices or diode-connected transistors and the ratio of two resistive means. Secondly, these two reference voltages are driving a summing circuit, each using current sources and resistive means to generate a current which is dependent on the ratio of the positive reference voltage and a resistive means, and the ratio of the negative reference voltage and another resistive means. These currents are then summed using a final resistive means which produces the fractional temperature-independent sub-bandgap reference voltage. The magnitude of the fractional, temperature independent sub-bandgap reference voltage is determined by selecting a specific value for that final resistive means.

A review U.S. Patents and U.S. Patent Applications relating to temperature sensors and/or calibration of temperature sensors has yielded:

U.S. Patent Application Publication 2004/0227651 (Furuichi) discloses an A/D-conversion circuit, a temperature-sensor circuit, and an integrated circuit, and a method of adjusting the temperature sensor circuit. The invention comprises a reference voltage generation circuit, a fuse circuit (the adjustment circuit), a current generation circuit, a current/voltage conversion circuit and the aforementioned A/D-conversion circuit. The latter further comprises a voltage generation circuit, other digital circuits and the digital output. The proposed array of analog and digital circuits converts an analog signal into digital data where the conversion voltage is not sensitive to noise. This is a complex and expensive circuit using a lot of chip real estate, but does not provide programmable calibration.

U.S. Pat. No. 6,828,847 (Marinca) describes a bandgap reference circuit for producing a stable temperature corrected voltage reference suitable for CMOS fabrication. The circuit produces a voltage reference which is entirely temperature stable over a reasonable temperature range by correcting the temperature curvature of the CTAT base-emitter voltage. However the circuit is not capable of providing multiple temperature outputs with programmable calibration.

U.S. Pat. No. 6,824,307 (Vail et al.) teaches the use of a capacitor in series with a circuit element as temperature sensor and a controller, where the circuit element has a resistance that varies with temperature, such as a thermistor. The controller is for charging/discharging the capacitor through the circuit element, measuring the charging/discharging time to a predetermined threshold and determining a temperature based upon the charging/discharging time. This circuit is essentially an RC circuit which may also include a calibration resistor for higher accuracy.

U.S. Pat. No. 6,377,110 (Cooper) presents a temperature sensing circuit which employs a silicon diode to provide a highly linear temperature dependent voltage, along with subsequent signal processing stages, either mixed-mode or digital, that collectively implement, through two-point calibration, independent adjustment of slope and output offsets. This circuit provides calibration but no programming capability for multiple temperature point outputs.

It should be noted that none of the above-cited examples of the related art satisfies the requirement of multiple temperature sensors combined with easy and efficient programming for close tracking and with a low demand on valuable chip real estate. The invention described hereafter answers these requirements.

SUMMARY OF THE INVENTION

It is an object of at least one embodiment of the present invention to provide a circuit and a method for a precise temperature sensor with fast programmable calibration.

It is another object of the present invention to provide a plurality of temperature sensors with selectable spacing between temperature points with simple calibration.

It is yet another object of the present invention to provide programmable resistive means to adjust the absolute magnitude of the temperature sensors.

It is still another object of the present invention to calibrate the slope of the temperature window between simulation and hardware.

It is a further object of the present invention is to calibrate the absolute temperature between simulation and hardware with a single measurement and a single programming adjustment.

These and many other objects have been achieved by providing a bandgap reference circuit with first and second reference voltages (VBE1 and VPos1) with a negative and a positive temperature coefficient, respectively. The two reference voltages each drive a current source with reference resistors Rn and Rp, respectively. A plurality of temperature sensing circuit (depending on the number of temperature points desired) are couple to the current sources. Part of each the temperature sensor circuit is a summing circuit which sums the two current sources and where the summing node is temperature independent based on the selection of resistors Rn and Rp. Coupled between this summing node and a reference potential is a programmable resistor Rb which enables fast calibration of the absolute temperature of the temperature points. This is done by measuring the hardware temperature of a single absolute temperature point and then to adjust it via programming to match the simulation value. The same programming value is then used to program the adjustment value for all the other temperature sensors. Another resistor Re coupled between the programmable resistor and the summing node determines the spacing between the temperature points. When this resistor Re increases uniformly for each of the temperature sensor circuits then the spacing of the temperature points is also uniform. Another resistor Rc coupled between the summing point and the current source with resistor Rn determines the actual negative temperature coefficient slope of voltages VN0 to VN3. A tap in the programmable resistor R2, which generates VPos1, provides a second reference voltage VPos2 also with a positive temperature coefficient. The intercept points between VN0 to VN3 and VPos2 determine the spacing of the temperature points T0 to T3. The spacing of the temperature points T0 to T3 is further determined by the slope of reference voltage VPos2 which is adjustable by the programmable resistor R2. VPos2 and VN0 to VN3 serve as inputs to amplifiers which generate the temperature sense points VT0 to VT3. The calibration of the slope of the temperature window proceeds in the following manner: check the spacing between temperature points (preferably the two points farthest apart, e.g. T0 and T3) by comparing the hardware and simulation results and adjust then the slope of VPos2 via the tap on programmable resistor R2.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 4 is a block diagram of the method of the present invention.

Use of the same reference number in different figures indicates like elements.

DESCRIPTION OF THE PREFERRED EMBODIMENT

Figure 1A:
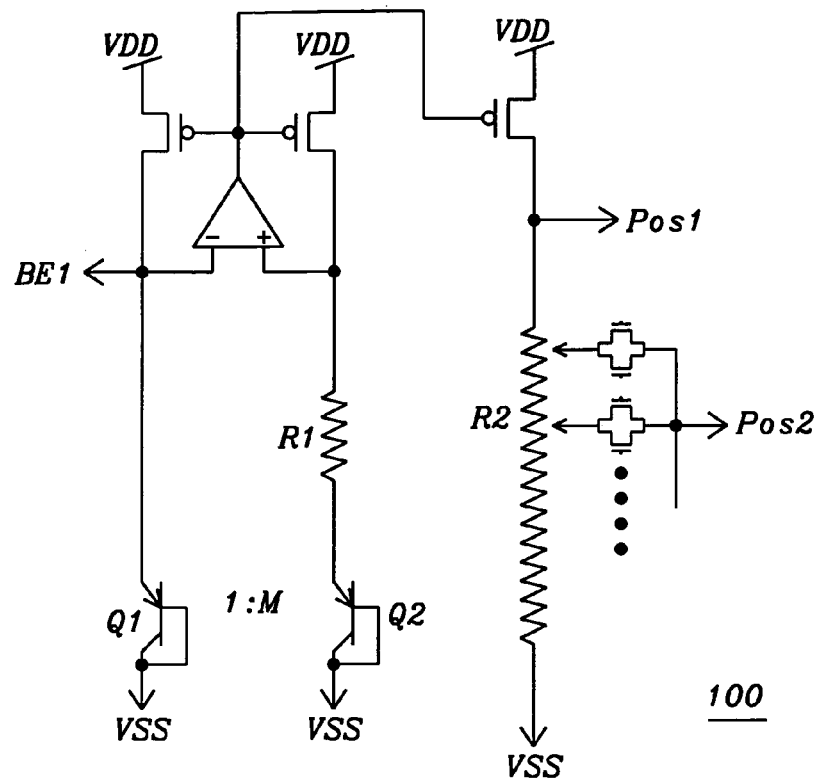
FIGS. 1a–c are circuit diagrams of the preferred embodiment of the present invention.
Figure 1C:
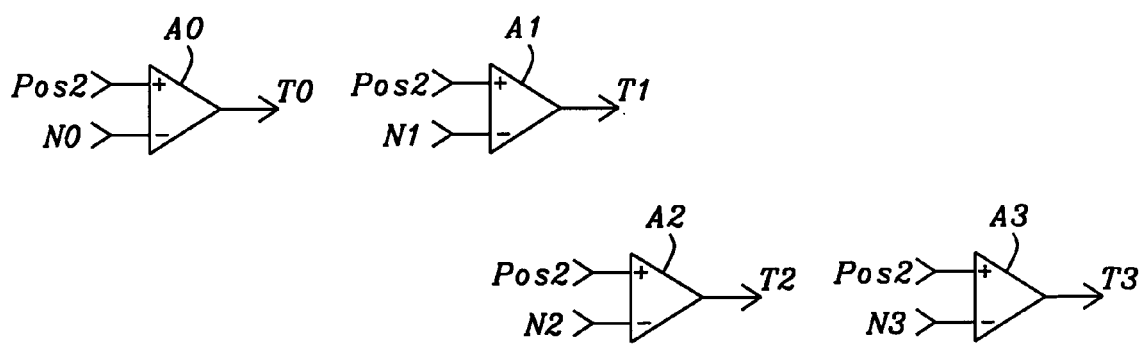
Figure 1B:
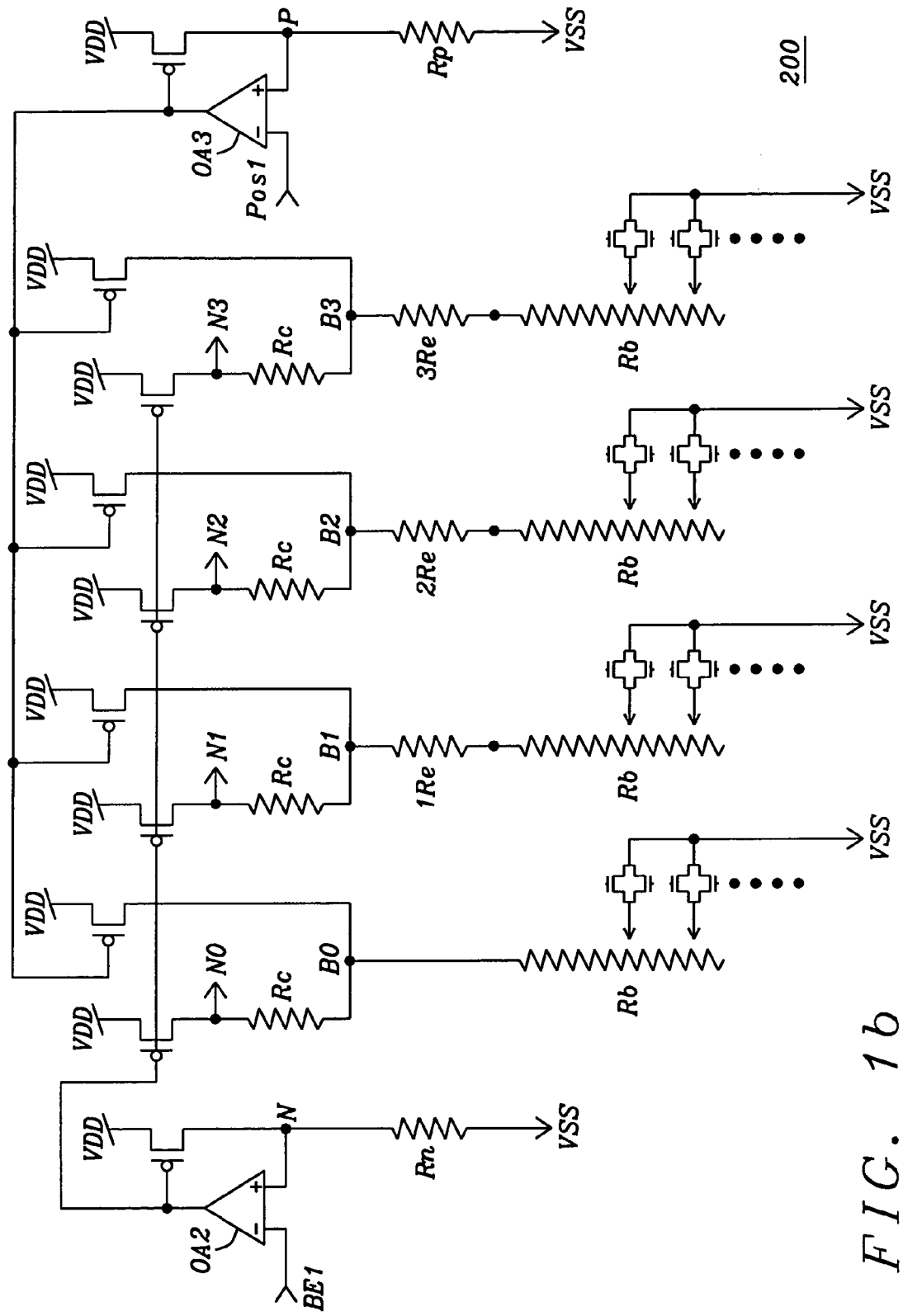

Circuits 100 of FIG. 1a, 200 of FIG. 1b, and 300 of FIG. 1c comprise the preferred embodiment of a precise temperature sensor with smart calibration.

FIG. 100 is a bandgap reference circuit identical to the referenced Related Patent Application with the exception that resistor R2 is a programmable resistor which can be programmed by the different pass-gates as indicated. The common output node of these pass-gates is Pos2 and provides a voltage VPos2. When programmed, the resistance seen between node Pos2 and VSS is designated as R2'. Former node POS is relabeled Pos1 and provides voltage VPos1.

Circuit 200 is similar to the summing circuit of the Related Patent Application, including the connections to circuit 100, but has been expanded to provide means for e.g. four temperature sensors 210, 211, 212, and 213, and the single current mirror driven by each by the outputs of op-amps OA2, OA3 was increased to four each. Resistor Rn (at node N) and resistor Rp (at node P) provide the same function (choosing the appropriate ratio of Rn/Rp secures a temperature independent voltage VB0, VB1, VB2, and VB3) as described in the Related Patent Application. For ease of identification, current mirrors driven by op-amp OA2 and OA3 will be called left and right current mirrors, respectively, without identifying these current mirrors individually. The four temperature sensors are similar in structure with only small variations to provide different temperature sense points. Typically each temperature sensor is a serial string of resistor Rc and a programmable resistor Rb coupled between a left current mirror and a reference potential VSS. The node between resistor Rc and the left current mirror is labeled N0, N1, N2, and N3, and delivers output voltages VN0, VN1, VN2, and VN3, for temperature sensors 210, 211, 212, and 213, respectively. The other end of each resistor Rc is coupled to a right current mirror and is labeled node B0, B1, B2, and B3, having voltages labeled VB0, VB1, VB2, and VB3, respectively. Temperature sensors 211, 212, and 213 have resistors 1Re, 2Re, and 3Re coupled between nodes B1, B2, and B3 and the respective resistor Rb. Note that temperature sensor 210 is without such a resistor Re. The uniform step-wise increase of Re defines the spacing between the temperature points; this will become more apparent upon studying the set of equations below. The voltage drop from the left current mirror to VSS for all four temperature sensors comprises three distinct components:

The constant voltage drop, via current from left current mirror only, across Rc, The constant, but adjustable (programmable) voltage drop, via currents from left and right current mirrors, across Rb and The voltage drop, via currents from left and right current mirrors, across the stepwise varied resistive component Re which goes from zero, to 1Re, 2Re, and 3Re for temperature sensors 210, 211, 212, and 213, respectively.

While the invention has been shown as changing Re monotonically, where the increase is on an integer basis, it is understood that this is by way of example only and does not reflect on the scope and intent of the invention and that any change to Re, fractional or otherwise, is also possible.

Circuit 300 comprises amplifiers A0, A1, A2, and A3, their minus(−) inputs coupled to nodes N0, N1, N2, and N3, respectively, while their positive (+) inputs are coupled to node Pos2. When the voltage VPos2 at the + input becomes more positive than the voltage at the respective—input then the respective output VT0, VT1 VT2, or VT3 goes positive.

It is obvious to those skilled in the art that the description of four temperature sensor outputs is by way of example only and that the number of sensor outputs may be both more or less without limiting the intent of the present invention.

From inspection of circuits 100, 200, and 300 we can generate the equations for voltages VN0 to VN3, and VB0 to VB3:

$$VN0 = [VBE1*(1/Rn) + VPos1*(1/Rp)] *$$
$$Rb + VBE1*(Rc/Rn)$$
$$= VB0 + VBE1*(Rc/Rn)$$

$$VN1 = [VBE1*(1/Rn) + VPos1*(1/Rp)] *$$
$$(Rb + 1Re) + VBE1*(Rc/Rn)$$
$$= VB1 + VBE1*(Rc/Rn)$$

$$VN2 = [VBE1*(1/Rn) + VPos1*(1/Rp)] *$$
$$(Rb + 2Re) + VBE1*(Rc/Rn)$$
$$= VB2 + VBE1*(Rc/Rn)$$

$$VN3 = [VBE1*(1/Rn) + VPos1*(1/Rp)] *$$
$$(Rb + 3Re) + VBE1*(Rc/Rn)$$
$$= VB3 + VBE1*(Rc/Rn)$$

where $VBE1 \sim -1.5$ mV/K $VT \sim +0.087$ mV/K

We can choose the appropriate ratio of Rn/Rp to get a temperature independent VB0, VB1, VB2, and VB3.

From inspection of the above equation for VN0, we can see that VB0 is defined as:

$$VB0 = [VBE1*(1/Rn) + VPos1*(1/RP)]*Rb$$

It follows that $$VB3-VB2=VB2-VB1=VB1-VB0=[VBE1*(1/Rn)+VPos1*(1/Rp)]*Re=\text{constant at any temperature}$$

Figure 2:
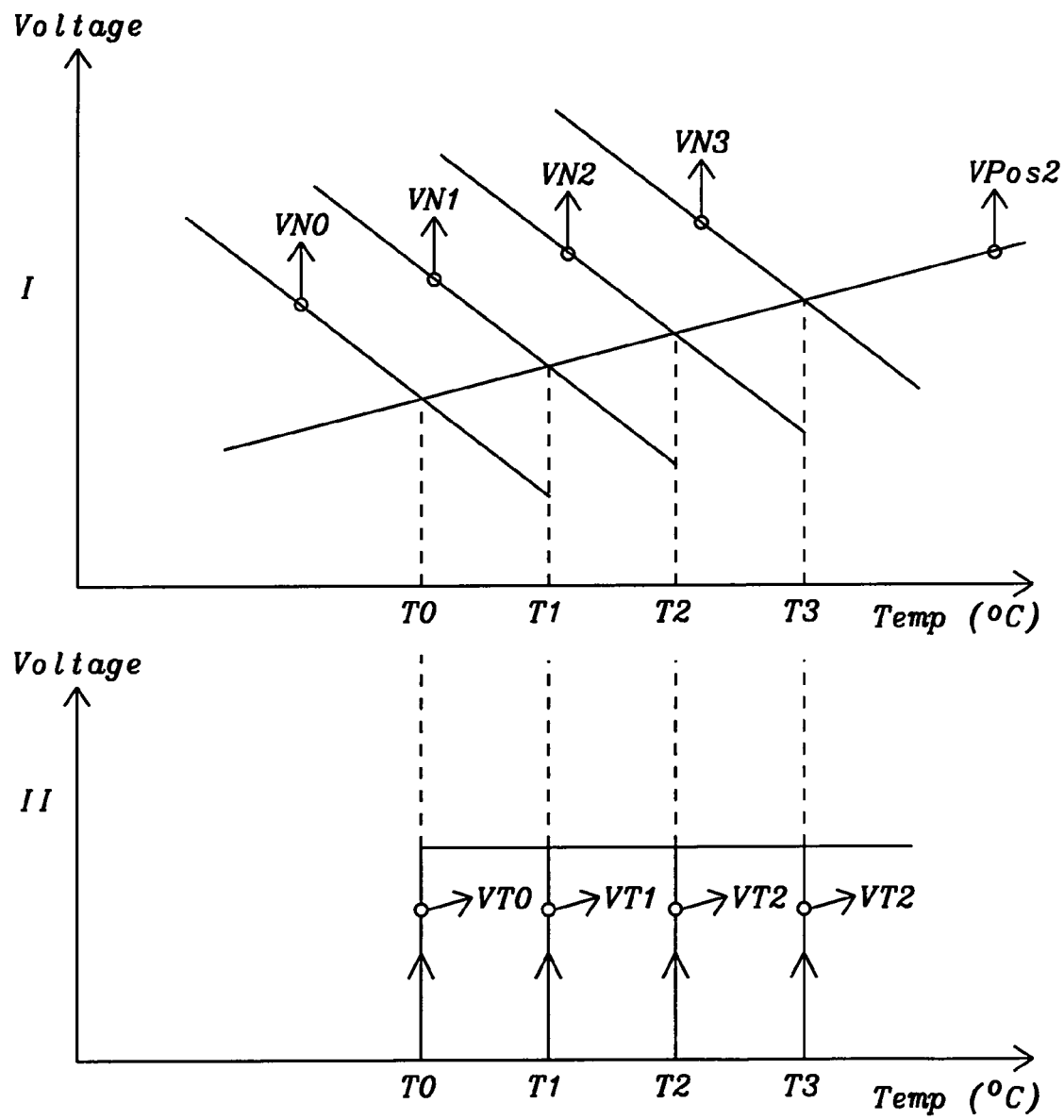
FIG. 2 is a graph of the positive and the four negative temperature coefficient voltage nodes of the circuits of FIGS. 1a–c, where the intersections mark the temperature points.

Therefore, the slopes of VN0, VN1, VN2, and VN3 are all the same, as illustrated in Graph I of FIG. 2, Curves VN0, VN1, VN2, and VN3. The intercept point of aforementioned Curves with Curve VPos2 defines the temperature points T0, T1, T2, and T3 on the X axis of Graph I. It is obvious from inspection of Graph I that a change in the slope of VPos2 changes the intercept points and therefore the spacing of the aforementioned temperature points along the X axis.

Graph II of FIG. 2, which like Graph I is a graph of temperature in ° C. on the X axis versus voltage on the Y axis, illustrates with Curves VT0, VT1, VT2, and VT3 the output VT0, VT1, VT2, and VT3 of amplifiers A0, A1, A2, and A3 at temperature points T0, T1, T2, and T3 on the X axis.

Figure 3:
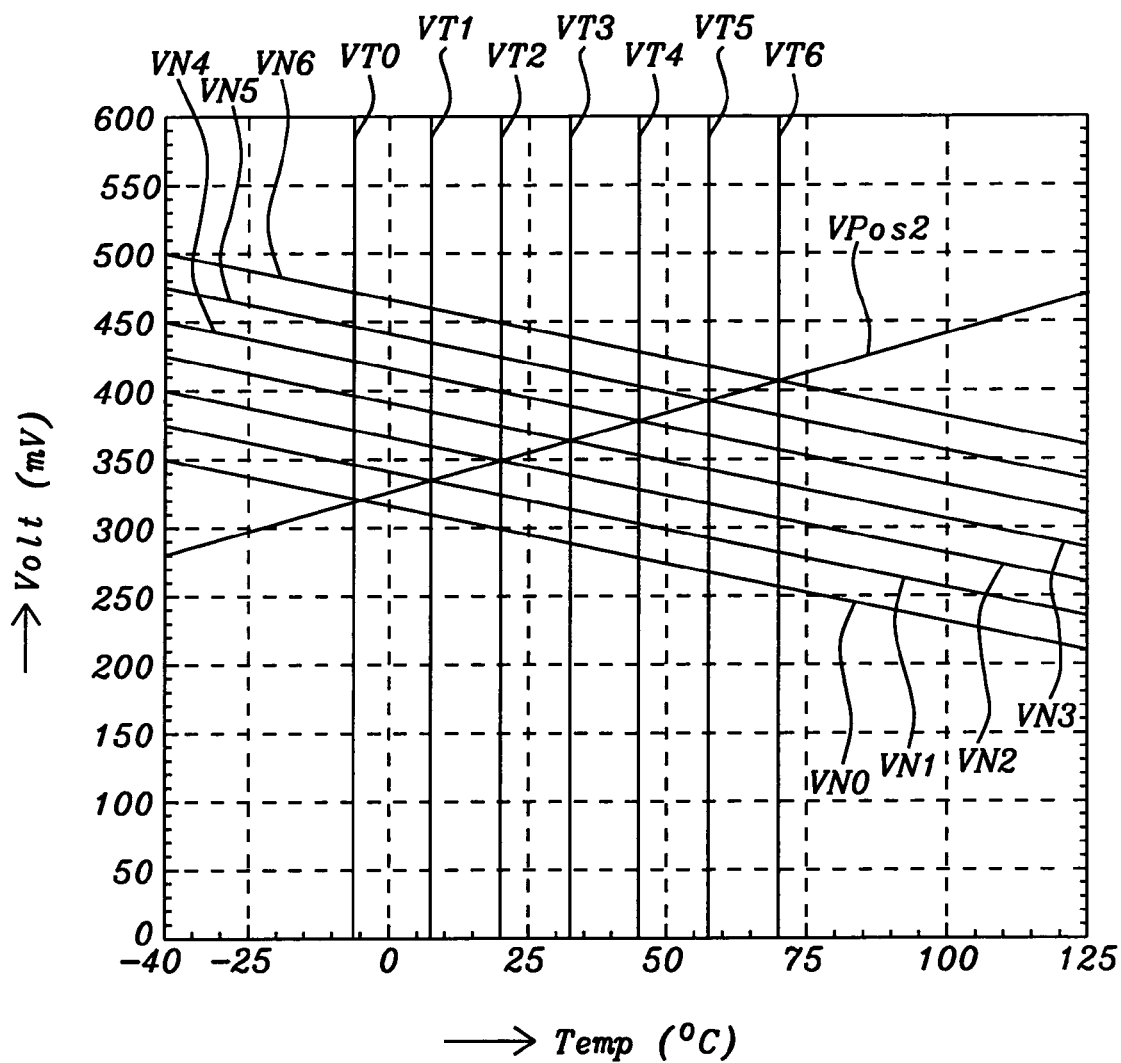
FIG. 3 is a graph of a simulation of a positive and seven negative temperature coefficient voltage nodes, where the intersections mark the temperature points.

The graph of FIG. 3 is the result of computer simulation of circuits 100, 200 and 300, where the number of temperature sensor outputs was increased to seven. Consequently there are seven output voltages VN0 to VN6, producing seven intercept point with VPos2, and seven temperature points with outputs VT0 to VT6. The X axis displays the temperature in ° C., the Y axis displays the output voltage in millivolts. The simulation demonstrates the linearity of the temperature sensors due to the design consideration given to circuits 100 and 200. The graph of FIG. 3 shows that outputs VN0 to VN6 all range between 200 and 500 mV.

Because VB3−VB2=VB2−VB1=VB1−VB0, T3−T2=T2−T1=T1−T0 there is before the programming of resistors R2 and Rb, a two-step test for the adjustment of the hardware temperature sensors.

Step 1: Calibration of Slope of the Temperature Window Between Simulation and Hardware.

Test the temperature window between T3 and T0 in the hardware, (i.e., the temperature window between the VT0 and the VT3 transition)

If the measured window is larger than that predicted by the simulation, one can program resistor R2' to increase the slope of VPos2 to fit the simulation value.

If the measured window is smaller than that predicted by the simulation, one can program the R2' to decrease the slope of VPos2 to fit the simulation value.

Step 2: Adjust the Absolute Temperature Between Simulation and Hardware.

Select T3 (or one of the other points) and measure its absolute value in the hardware, (the temperature of the VT3 transition).

One can program Rb to adjust the temperature sensor T3 to match the simulated T3 value. While one could adjust all the temperature sensors T0, T1, and T2, this is not necessary because when one gets the difference of the measured T3 and the simulated T3, one can then predict the differences of the other values (T2, T1, and T0), because T3−T2=T2−T1=T1−T0 from the above discussion, or because the slopes of VN0, VN1, VN2, and VN3 are all the same and T3−T0 is calibrated between hardware and simulation.

Therefore one does not need to calibrate all of the temperature sensors one by one, and one can save much testing and adjusting time.

When the accuracy of the temperature sensor is very important, then calibration on a die-by-die basis is required.

Referring to FIG. 4, we now describe the method of providing a temperature sensor with programmable calibration:

Block 1 provides first and second reference voltages with negative and positive temperature coefficients, respectively, where the second reference voltage is generated across a first programmable resistor and which when programmed provides a third reference voltage;

Block 2 provides amplifying circuits to generate first and second currents proportional to the first and the second reference voltage;

Block 3 connects a plurality of serially coupled first resistors and second programmable resistors between the source of the first current and a reference voltage;

Block 4 sums the first and the second current by coupling the source of the second current to the junction of the first resistor and the second programmable resistor;

Block 5 generates a temperature sense point at the intercept of the third reference voltage with the voltage generated across each of the combinations of first resistors and second programmable resistors.

While the invention has been particularly shown and described with reference to the preferred embodiments thereof, it will be understood by those skilled in the art that various changes in form and details may be made without departing from the spirit and scope of the invention.

What is claimed is:

1. A temperature sensor with programmable calibration, comprising:

a reference circuit generating a first reference voltage with a negative temperature coefficient at a first output and a second reference voltage with a positive temperature coefficient at a second output, where said second reference voltage is generated across a first programmable resistive means, where a tap of said first programmable resistive means generates a third reference voltage with a positive temperature coefficient where a change of said tap changes the slope of said third reference voltage;

a first amplifying circuit coupled to said first output of said reference circuit to generate by means of a first current source a first current directly proportional to said first reference voltage and the reciprocal of a first resistive means;

a second amplifying circuit coupled to said second output of said reference circuit to generate by means of a second current source a second current directly proportional to said second reference voltage and the reciprocal of a second resistive means; and a plurality of temperature sensing circuits each coupled to outputs of said first current source, said plurality of temperature sensing circuits each comprising, coupled serially, a third resistive means and a second programmable resistive means to generate an output reference voltage at said output of said first current source for each of said plurality of temperature sensing circuits, where the junction of said third resistive and said second programmable resistive means is coupled to the output of said second current source, thus summing said first and said second currents in said second programmable resistive means.

2. The temperature sensor of claim 1, wherein said first reference voltage with a negative temperature coefficient is derived from the voltage drop of diode-like means.

3. The temperature sensor of claim 1, wherein said second reference voltage with a positive temperature coefficient is derived from the difference of voltage drops of diode-like means with different area ratios.

4. The temperature sensor of claim 1, wherein an amplifier of said first amplifying circuit has its plus input coupled to said first output of said reference circuit and its minus input coupled to said first resistive means.

5. The temperature sensor of claim 1, wherein an amplifier of said second amplifying circuit has its plus input coupled to said second output of said reference circuit and its minus input coupled to said second resistive means.

6. The temperature sensor of claim 1, wherein the voltage drop across said third resistive means is proportional to said first reference voltage times the ratio of said third resistive means over said first resistive means.

7. The temperature sensor of claim 6, wherein a single matching of said first programmable resistive means to a simulation value adjusts the slope of all said output reference voltages.

8. The temperature sensor of claim 1, wherein said second programmable resistive means adjusts the absolute value of said output reference voltages.

9. The temperature sensor of claim 1, wherein said junction of said third resistive and said second programmable resistive means is temperature independent through the appropriate ratio of said first and said second resistive means.

10. The temperature sensor of claim 1, wherein after measuring the difference of anyone of said output reference voltages and its corresponding simulation value all of said second programmable resistive means can be programmed with the same value thus activating the same tap on each of said second programmable resistive means.

11. The temperature sensor of claim 1, wherein said third reference voltage is coupled to one input of a plurality of amplifiers and a respective output reference voltage is coupled to another respective input of said amplifiers, thus producing a temperature sensor signal for each respective output reference voltage.

12. The method of providing a temperature sensor with programmable calibration, comprising the steps of:
  a) providing first and second reference voltages with negative and positive temperature coefficients, respectively, where the second reference voltage is generated across a first programmable resistive means and which when programmed provides a third reference voltage;
  b) providing amplifying circuits to generate first and second currents proportional to said first and said second reference voltage;
  c) coupling between the source of said first current and a reference voltage at least one serially coupled first resistive means and second programmable resistive means;
  d) summing said first and said second current by coupling the source of said second current to the junction of said first resistive means and said second programmable resistive means; and
  e) generating a temperature sense point at the intercept of said third reference voltage with the voltage generated across each of said at least one combination of said first resistive means and said second programmable resistive means.

13. The method of claim 12, wherein said second programmable resistive means provides for calibration of the absolute temperature of said temperature sense point.

14. The method of claim 12, wherein each of said second resistive means further comprises a third resistive means coupled in series.

15. The method of claim 14, wherein by selecting unique values for each of said third resistive means unique values for each of said temperature sense points are provided.

16. The method of claim 12, wherein the slope of said positive temperature coefficient is calibrated by measuring the spread between two of said temperature sense points and to then program said first programmable resistive means to match a simulation value.

17. The method of claim 12, wherein the absolute temperature is calibrated by measuring the magnitude of said intercept and then programming all of said second programmable resistive means to match a simulation value.

18. The method of claim 12, wherein said junction of said first resistive means and said second programmable resistive means is temperature independent through the appropriate ratio of first and second resistive means in said amplifying circuits.

* * * * *